May 25, 1965 M. A. PROVI 3,185,233
PORTABLE STAND-UP TYPE BATHROOM SCALE
Filed June 20, 1963
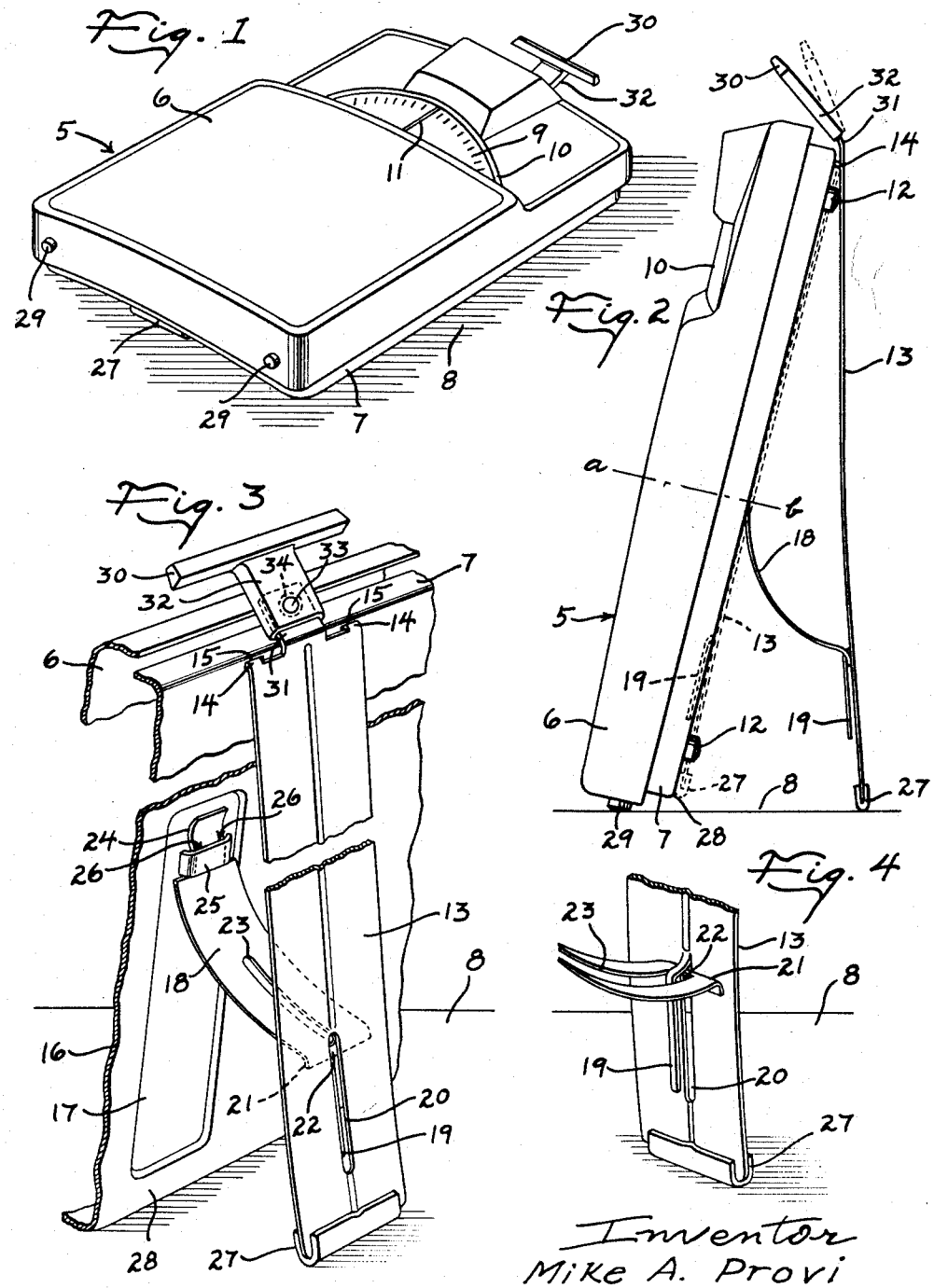
Inventor
Mike A. Provi

United States Patent Office 3,185,233
Patented May 25, 1965

3,185,233
PORTABLE STAND-UP TYPE BATHROOM SCALE
Mike A. Provi, Rockford, Ill., assignor to The Brearley Company, Rockford, Ill., a corporation of Illinois
Filed June 20, 1963, Ser. No. 289,265
10 Claims. (Cl. 177—239)

This invention relates to bathroom scales, and is more particularly concerned with a portable stand-up type bathroom scale wherein the base has a thin flat sheet metal easel type supporting leg foldable out of the way under it, pivoted at its one end on an axis at right angles to the longitudinal center line relative to the bottom thereof and urged outwardly to supporting position by means of a leaf spring that is neatly housed in a recess provided therefor in the under side of the base, so that the scale platform need not be at any higher elevation than otherwise and when the parts mentioned are folded they take up very little space and the scale can accordingly rest on the floor in the usual way, using only the usual projecting anti-skid buttons on the bottom of the base to engage the floor and support the base in the required spaced relationship to the floor, other similar anti-skid buttons being preferably provided also on that end of the platform remote from the easel leg pivot, so that the bathroom scale can be safely stood up in any convenient space when not in use so as to be out of the way.

In accordance with my invention, a nicely plated and decorative T-shaped handle is provided at the front end of the scale where it can be easily grasped, the same being permanently secured to an upwardly and forwardly projecting lug provided on the pivoted end of the easel leg and arranged to be grasped in raising the front end of the scale to stand it up, the forward pull of this handle after the scale is resting on the floor on its one end helping to swing the easel leg outwardly to its operative position, the outward swinging movement being limited positively by a stop provided on the outer end of the leaf spring that is slidably pivotally connected with the free end portion of the easel leg. The handle also is useful in facilitating replacement of the scale again in horizontal operative position on the floor.

The invention is illustrated in the accompanying drawing, in which:

FIG. 1 is a perspective view of a bathroom scale of the stand-up type embodying my invention and shown in its normal operative position resting on the floor;

FIG. 2 is a side view of the scale shown stood on end, the folded position of the easel leg being indicated in dotted lines;

FIG. 3 is a perspective view of FIG. 2 better illustrating the construction, and FIG. 4 is a fragmentary perspective view of the slotted free end portion of the easel leg looking at the inner side thereof to better illustrate the construction.

The same reference numerals are applied to corresponding parts throughout these views.

Referring to the drawing, the bathroom scale designated generally by the reference numeral 5 may be considered to be of any conventional type having a platform 6 on which the person to be weighed stands while the base 7 is disposed in a substantially horizontal position resting on a floor 8, the platform 6 being supported on a system of levers fulcrumed in the base 7, as illustrated, for example, in Provi Patents No. 2,667,387 and No. 2,668,045, whereby to stretch a weighing spring, the elongation of which is measured and through suitable intermediate mechanism indicated on a rotary dial, a portion of which is seen at 9 in FIG. 1 through a lens 10 mounted in an opening in the platform 6, so that the person standing on the platform can easily read his weight by noting the position of the dial with respect to the index wire or hairline 11. The base 7 has rubber buttons or pads 12 on the bottom thereof at the four corners to provide good anti-skid support for the scale on the floor for safer use of the scale.

In accordance with my invention, a thin, flat sheet metal easel type supporting leg 13 is provided on the bottom of the base 7 foldable out of the way under the base on the longitudinal center line thereof and therefore midway between the opposed pairs of supporting buttons or pads 12, the leg 13 being pivoted by means of a pair of upwardly bent lugs 14 to the base 7, the lugs being entered freely through slots 15 provided in the front end of the base and having tabs bent therefrom next to the bottom of the base 7 after the entry of the lugs 14 to prevent withdrawal without interfering with the free pivotal movement of the leg 13 relative to the base 7. The bottom wall 16 of the base 7 is recessed lengthwise, as indicated at 17, to house both a leaf spring 18 and the elongated lug 19 bent inwardly from the lower portion of leg 13 from slot 20 into parallelism with the leg to provide for a sliding pivotal connection between the arcuately bent free end portion 21 of the leaf spring 18 and the lower end portion of the leg 13, as indicated at 22 in FIG. 3, 22 being a web portion left at the outer end of the leaf spring at that end of the elongated slot 23 provided in the free end portion of the leaf spring 18 extending longitudinally thereof on its longitudinal center line. The leaf spring 18 has a reduced attaching end portion 24 bent longitudinally to arcuate form, so that when it is thrust endwise under a downwardly struck transverse strap portion 25, this end of the leaf spring 18 is fastened securely enough by reason of the frictional hold and also by virtue of outwardly crimped edge portions 26 that engage behind the strap 25 so that no other fastening means is necessary. The leg 13 lies flat against the underside of the base 7 up to the depression 17, namely, approximately to the line a–b indicated in FIG. 2, and is bent outwardly at a small angle so that the lower end portion, on which a U-shaped anti-skid pad 27 is suitably secured, as by cementing, has a slight amount of clearance with respect to the adjacent end 28 of the base 7, as indicated in the dotted line showing of leg 13 in FIG. 2. Leaf spring 18 being normally bowed, as shown in FIGS. 2 and 3, serves when flattened to substantially straight form in depression 17 by folding of leg 13 against the bottom of base 7 to exert outward pressure against the lower end portion of the leg 13 tending to swing it to the supporting position shown in FIGS. 2 and 3 to support the scale 5 standing on end, with the two rubber anti-skid buttons or pads 29 that are provided on what is then the lower end of the platform 6 resting on the floor 8, similarly as the anti-skid pad 27, so as to reduce likelihood of any slippage and also prevent marring of the finish on the scale platform by keeping this end of the platform clear of the floor, as seen in FIG. 2. In the folded position of the leg 13 the rubber anti-skid buttons or pads 12 support the scale 5 on the floor 8 with adequate clearance therebetween for the leg 13, as should be evident from the dotted line showing of the leg 13 in FIG. 2.

A nicely plated and decorative T-shaped handle 30 is provided at the front end of the scale 5 where it can be easily grasped when the scale is to be stood up on end from the normal horizontal operative position shown in FIG. 1 to that shown in FIG. 2, there being a lug 31 bent upwardly and forwardly from the pivoted end of the leg 13 and entered in the tubular leg 32 of the T-shaped handle 30 and suitably secured in place by indenting the rear wall of the tubular leg, as indicated at 33, into an aperture 34 provided therefor in lug 31.

In operation, when the scale 5 is disposed in its normal horizontal operative position on the floor, as shown in FIG. 1, the handle 30 is disposed so that it may be easily grasped to rest the front end of the scale to stand it up, the upward pull on the handle helping at the same time to swing the easel leg 13 outwardly to its operative position. The outward swinging movement of the easel is limited positively by the stop 22 provided on the outer end of leaf spring 18 that is slidably pivotally connected with the free end portion of the leg, as indicated at 19. The leaf spring 18 being normally bowed, as shown in FIGS. 2 and 3, holds the easel leg 13 in the extended position for good support of the scale in the upright position, and in this position the anti-skid pad 27 on the lower end of the easel leg 13, and the two anti-skid pads 29 on the lower end of the platform 6 provide good and dependable tripod support regardless of the anticipated irregularities in the floor 8 on which the scale is supported. The handle 30 is also useful in facilitating replacement of the scale again in its horizontal operative position on the floor, and in this operation the pad 27 serves by frictional engagement with the floor to facilitate folding of the easel leg 13 against the underside of the base 7 against the action of spring 18.

It is believed the foregoing description conveys a good understanding of the objects and advantages of my invention. The appended claims have been drawn to cover all legitimate modifications and adaptations.

I claim:

1. A portable bathroom scale comprising a supporting base of generally rectangular form, a generally rectangular platform connected in assembled relation to the base but supported on and movable downwardly with respect thereto in a weighing operation, when the base and platform are horizontally disposed for use in weighing with the base resting on the floor, said scale being constructed to be adapted for use in weighing only in horizontal position resting on a floor and to permit its being stood on its one end on the floor, and an elongated supporting leg disposed on the longitudinal center-line of the base and pivoted at one end to said base and swingable from an inoperative retracted folded position parallel to the bottom of said base to an operative position at an acute angle to the bottom of said base for support of the scale as a prop while it is standing on end on the floor inclined from a vertical, said base being constructed to rest squarely on the floor without any interference from said supporting leg in the folded position thereof.

2. A portable bathroom scale as set forth in claim 1, including a bumper pad of resilient shock absorbing material on the free end of said supporting leg to engage the floor, and two bumper pads of resilient shock absorbing material in equally spaced relation on opposite sides of the longitudinal center-line of the scale on the floor engaging end of the scale in stand-up position, whereby to provide three-point support of the scale in standup position.

3. A portable bathroom scale as set forth in claim 1 including spring means acting between said base and said supporting leg normally urging the latter to swing outwardly to operative position for support of the scale in standup position, said spring means being yieldable to permit disposition of said supporting leg in retracted position when the scale is disposed for use restng horizontally on the floor.

4. A portable bathroom scale as set forth in claim 3, wherein said spring means comprises a normally bowed elongated leaf spring disposed lengthwise of the bottom of said base behind said supporting leg secured at one end to one of said base and leg and having its free end slidably engaging the other of said base and leg.

5. A portable bathroom scale as set forth in claim 3, wherein said spring means comprises a normally bowed elongated leaf spring disposed lengthwise of the bottom of said base behind said supporting leg secured at one end to one of said base and leg and having its free end slidably engaging the other of said base and leg, and means whereby the sliding movement is limited so as to limit the outward swinging movement of said supporting leg relative to said base.

6. A portable bathroom scale as set forth in claim 1, including means for yieldably swinging said supporting leg outwardly relative to said base to operative position and limiting such movement, said means comprising an elongated bowed leaf spring disposed lengthwise of the bottom of said base behind said supporting leg secured at one end to said base and having an elongated slot provided in its other end leaving a transverse web at its outer end slidably engaging the inner side of said leg, said leg having an elongated lug provided thereon lengthwise thereof in spaced parallel relationship to the inner side of said lug entered in said slot and slidably engaging the transverse web so as to limit the outward swing of said leg relative to said base.

7. A portable bathroom scale as set forth in claim 1, including means for yieldably swinging said supporting leg outwardly relative to said base to operative position and limiting such movement, said means comprising an elongated bowed leaf spring disposed lengthwise of the bottom of said base behind said supporting leg secured at one end to said base and having an elongated slot provided in its other end leaving a transverse web at its outer end slidably engaging the inner side of said leg, said leg having an elongated lug provided thereon lengthwise thereof in spaced parallel relationship to the inner side of said lug entered in said slot and slidably engaging the transverse web so as to limit the outward swing of said leg relative to said base, said base having a recess provided in the bottom thereof in which said leaf spring is mounted, said recess housing both said leaf spring in flattened condition and said lug in the retracted position of said supporting leg so as to enable less elevation of said scale relative to the floor in the horizontal position for use while still providing enough clearance for said supporting leg in retracted position.

8. A portable bathroom scale as set forth in claim 1, including a handle on an extension provided on the pivoted end of said supporting leg, said handle projecting forwardly from the front end of said scale and adapted to be grasped to raise the scale from a horizontal position for use to the standup position, the upward pull on said handle causing a downward thrust against the floor at the free end of said supporting leg in the pivotal movement thereof relative to said base to assist in raising said scale to standup position and at the same time dispose the leg in scale-propping position.

9. A portable bathroom scale as set forth in claim 1, including a handle on an extension provided on the pivoted end of said supporting leg, said handle projecting forwardly from the front end of said scale and adapted to be grasped to raise the scale from a horizontal position for use to the standup position, the upward pull on said handle causing a downward thrust against the floor at the free end of said supporting leg in the pivotal movement thereof relative to said base to assist in raising said scale to standup position and at the same time dispose the leg in scale-propping position, and means limiting pivotal movement of said supporting leg with respect to said base.

10. A portable bathroom scale as set forth in claim 1, including a handle on an extension provided on the pivoted end of said supporting leg, said handle projecting forwardly from the front end of said scale and adapted to be grasped to raise the scale from a horizontal position for use to the standup position, the upward pull on said handle causing a downward thrust against the floor at the free end of said supporting leg in the pivotal movement thereof relative to said base to assist in raising said scale to standup position and at the same time dispose the leg in scale-propping position, and spring means acting between said base and said supporting leg normally urging the latter to swing outwardly to operative position for support of the scale in standup position, said spring means being yieldable to permit disposition of said supporting leg in retracted position when the scale is disposed for use horizontally on the floor.

References Cited by the Examiner
UNITED STATES PATENTS

| | | | |
|---|---|---|---|
| 730,027 | 6/03 | Kevorkian | 45—73 |
| 2,098,845 | 11/37 | Weber et al. | 177—239 |
| 2,553,174 | 5/51 | Cross | 248—37 |
| 2,732,481 | 1/56 | King | 248—34 |
| 3,101,804 | 8/63 | Aleks | 177—239 |

LEYLAND M. MARTIN, *Primary Examiner.*
LEO SMILOW, *Examiner.*